United States Patent Office 3,039,224
Patented June 19, 1962

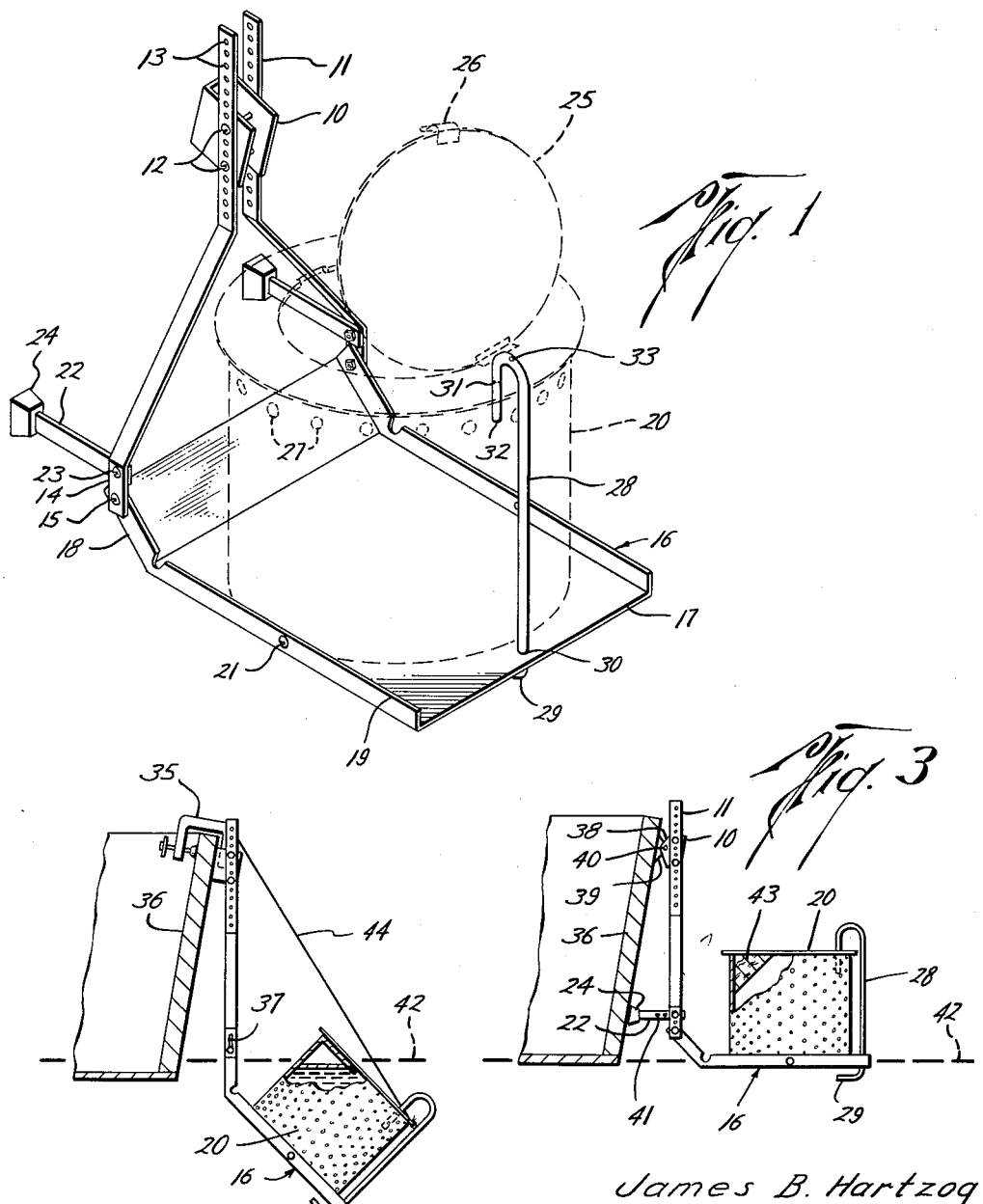

3,039,224
BAIT WELL ASSEMBLY
James B. Hartzog, 7942 Glenscot, Houston, Tex.
Filed Oct. 24, 1960, Ser. No. 64,402
8 Claims. (Cl. 43—56)

My present invention relates to a live bait well adapted for attachment to and use with a fishing boat, particularly a relatively small boat as employed by sport fishermen.

Live bait wells are widely used by fishermen and usually comprise a small container having means to provide for circulation of water therethrough. In many cases, bait wells are built into the boat and supplied with water by a through-the-bottom or over-the-side conduit, but it is not uncommon for a portable bait container to be carried within the boat and periodically dropped over the side to freshen the water therein. However, any type of live bait well which is exposed to severe temperature change will be unable to keep the bait alive for considerable periods of time. Thus it is desirable to keep the temperature of the water therein substantially constant, and no device with which I am familiar fully meets this requirement.

It is apparent that the most convenient method of maintaining constant temperature within the container is to immerse it in the water. When a boat is at rest, it is quite practical to hang a perforated can over the side or rear in a substantially submerged position where the water can circulate freely through perforations which are too small to allow the bait to escape. However, in moving from place to place, an external submerged bait well creates an undesirable drag and also tends to oscillate or knock against the boat unless it is rigidly affixed thereto. Although the container could be lifted into the boat during movement, the life of the bait would be shortened if it were kept out of the water for long periods without means to provide circulation.

Previous inventors have appreciated the advantages of an articulated suspension mechanism which will allow a submerged container to raise itself to near the surface of the water responsive to its movement therethrough, but they have left unsolved many of the problems involved in such an arrangement. Thus, it is a primary object of my invention to provide an improved bait well assembly adapted for attachment to the rear of a boat and capable of automatically rotating itself out of the water responsive to movement of the boat, with means to maintain constant circulation of water therethrough.

It is also an object of my invention to provide a bait well assembly removably attachable to the rear of a boat which will automatically revolve from a position of substantial submergence to a second position at or near the surface of the water responsive to movement of the boat.

It is a further object of my invention to provide a bait well assembly of the indicated type which includes a horizontal axis of rotation for the bait container about which such container rotates between an in-the-water and an out-of-the water position, responsive to the rate of movement of the boat.

It is a further object of my invention to provide a bait well assembly of the indicated type in which a planing member is attached to the bait container, against which the force of movement of water relative thereto will act to rotate the planing member from a position substantially below the surface of the water when the boat is at rest to an almost horizontal position at or near the surface of the water when the boat is underway.

It is a further object of my invention to provide, in combination with the bait well assembly of the indicated type, water circulating means operative in response to movement of the boat to pick up a continuous stream of water from the body in which the boat is moving and direct it into the bait container to provide continuous circulation of water therethrough.

It is a further object of my invention to provide, in combination with the bait well assembly of the indicated type, means to aerate the water circulating therethrough.

It is also an object of my invention to provide a bait well assembly in which the bait container is vertically adjustable in height relative to the boat, thereby rendering it of universal utility without regard to the freeboard of the boat.

These and other objects of my invention are carried out by an assembly comprising a mounting bracket assembly adapted for releasable attachment to the transom of a boat, a bait container rotatably mounted on the bracket assembly near the water line, and a water circulating conduit extending from below the bottom of the container to a point near the top thereof. The pivot point of the bait container is near the bottom thereof, and a planing member attached to or forming the base of the container presents a face against which the water may operate to produce rotation about the pivot when there is relative movement therebetween. The conduit which projects below the planing member offers an opening into which water is forced as the boat moves therethrough. The other end of the conduit at the upper end of the bait container discharges the water downwardly thereinto to provide constant circulation. A group of apertures near the top of the container provides avenues for overflow.

The foregoing design as described in more detail hereinafter is shown in the attached drawings in which:

FIG. 1 is a perspective view of my bait well asesmbly;

FIG. 2 is a side elevational view of my bait well assembly attached to the rear portion of a fishing boat at rest; and FIG. 3 is a side elevational view of my bait well assembly attached to the rear portion of a boat which is under way, showing certain modifications in the bracket assembly.

Referring first to FIG. 1, reference numeral 10 indicates a U-shaped bracket which is adapted for attachment to a small boat. A conventional C-clamp is employed to releasably secure the bracket near the top of the transom, in which position it provides the primary support for the remaining elements of the assembly as described hereinafter.

A pair of identical leg members 11 are secured to the bracket 10 by two bolts 12 passing therethrough. Although the bracekt 10 is inclined relative to the vertical at an angle determined by the transom of the boat, the legs 11 are substantially vertical. A series of holes 13 through the upper ends of the legs 11 allow ready vertical adjustment to compensate for differences in the distance between the top of the transom and the water line.

The legs 11 bend outwardly through the intermediate portion of their length, and then terminate at their lower ends in the vertical lugs 14. Attached to the lugs 14 by bolts 15 is the planing member 16 which has a substantially flat base portion 17 and an upwardly inclined hinge portion 18. A flange 19 is turned upwardly along the sides of both the base portion 17 and hinge portion 18.

It is apparent that the bracket assembly comprising the bracket 10 and legs 11 forms a substantially rigid frame projecting downwardly behind the boat, and that the planing member 16 is rotatable relative thereto about the bolts 15. The bait can 20, attached to the planing member 16 by the screws 21 through the flange 19, will rotate with the planing member from a position of substantial submergence as shown in FIG. 2 to a position atop the water as shown in FIG. 3.

Although the bracket assembly is provided with sufficient rigidity for normal use by the two bolts 12 passing through the legs 11 and bracket 10, braces may be attached to support the legs 11 against the boat near the water line. Such auxiliary members are indicated by reference numeral 22 in FIGS. 1 and 3, and are secured to the lugs 14 by bolts 23. The rubber heads 24 mounted on the ends thereof bear against the boat.

The bait can 20 may be of any conventional type having a lid 25 and releasable latch 26, and a group of apertures 27 near the top for overflow. The circulating conduit 28 extends from an inlet end 29, through the hole 30 in the planing member 16, through the hole 31 in the top of the bait can 20, and terminates in a discharge end 32 within the upper portion of the can. A conventional aerator 33 of the type which introduces air into a conduit through a lateral opening may be inserted at any convenient point along the length of the conduit 28. The discharge end 32 of the conduit 28 is above the level of the apertures 27, so that the water in the can will not siphon therethrough when the can is lifted from the water.

Referring now to FIGS. 2 and 3, certain additional elements and structural modifications shall be noted before the operation of my invention is described. In FIG. 2, a C-clamp 35 holds the bracket 10 against the transom 36 of the boat. The braces 22 are omitted in this installation and the lugs 14 are provided with elongated holes 37 to accommodate bolts 15. This arrangement allows the planing member 16 a certain amount of flexibility, as it can move within the limits of holes 37 in adjusting itself to the water line, as shall become more apparent hereinafter.

In FIG. 3, the bracket 10 has a lug 38 mounted thereon which is secured to a similar lug 39 on the transom of the boat by a horizontal pin 40. The lug 39 is affixed to the transom as convenient, either by bolts or a C-clamp such as shown in FIG. 2, and thus the bracket 10 and legs 11 may rotate about pin 40, and the angle of the bracket assembly relative to the transom will be determined by braces 22. Adjustment of this angle is provided by the holes 41 through braces 22 which are of a size to accommodate the bolt 23.

In operation, the several structural embodiments described above achieve a similar purpose which is to conveniently position the axis of rotation of the planing member 16 near the water line of any boat with which my invention may be used. It will be observed in FIGS. 2 and 3 that the water line 42 which is common to both is somewhat higher on the boat at rest in FIG. 2 than on the boat underway in FIG. 3. The difference is attributable to the fact that a moving boat will draw less water at the rear end thereof than will a standing boat. It is this condition which influences the length and angle of inclination of the hinge portion 18 of planing member 16, for it is desirable that the bait can 20 be almost wholly submergible below the standing water line and also rotatable into a position where planing member 16 is at the moving water line. Further, the base portion 17 should be presented at a proper angle to the direction of movement of the boat so that it will rotate from the FIG. 2 position to the FIG. 3 position responsive thereto.

When the boat is at rest, it may be desirable to prevent total immersion of the bait can. To this end, I provide a small buoyant member 43 within the upper forward portion of the can. As the bait can assembly settles into the water the buoyant member will remain partially afloat and will tend to oscillate in response to ripples and wavelets and circulate water through the apertures 27.

For convenience in raising the bait can from the water, a rope 44 may be attached thereto and anchored at a convenient point atop the bracket assembly or within the boat.

The lower end 29 of water conduit 28 is open in the direction normal to the movement of the boat. Thus when the boat is underway and the force of the moving water against the planing member 16 has rotated the bait can assembly into the position shown in FIG. 3, water will be forced into the conduit and discharged downwardly from end 32.

It will be apparent that the conduit 28 is not required when the boat is at rest, for water will circulate freely through the apertures 27 so long as the bait can 20 is submerged.

My bait well assembly can be attached to the rear of the boat in a position removed from the longitudinal center line thereof if desired. This is a useful feature, for it allows my invention to be used concurrently with an outboard motor without interference therewith.

Although several combinations of the features described herein and many inconsequential changes and modifications may occur to those employing my invention, it is desired to protect by Letters Patent all such combinations, changes and modifications as fall within the scope of the following claims.

I claim:

1. A bait well assembly comprising a rigid bracket assembly for releasable attachment to the transom of a boat to project downwardly therebehind to the vicinity of the water line and a bait container assembly pivotally attached to said rigid bracket assembly at but a single axis whereby said container assembly is rotatable about said single axis from a substantially horizontal position to a substantially vertical position, said bait container assembly comprising a substantially flat-bottomed bait can and a hinge member attached to the forward bottom edge thereof for said pivotal attachment to said rigid bracket assembly at said single axis of rotation.

2. The combination of claim 1 and a water conduit attached to said bait can and extending from below the bottom thereof to within the upper portion thereof, said water conduit having an inlet opening at its lower end normal to the forward direction when said bait can is in a substantially vertical position and an outlet opening at its upper end directed downwardly into said can.

3. A bait well assembly comprising a rigid bracket assembly for attachment to the transom of a boat to project downwardly therebehind to the vicinity of the water line, a substantially flat bottomed bait container carried behind said bracket assembly, a single uniaxial pivotal joint connecting the forward bottom edge of said bait container to the lower end of said bracket assembly whereby said container assembly is rotatable relative to said rigid bracket assembly only about said single joint from a substantially horizontal position to a substantially vertical position, and a water conduit extending from below said bait container into the upper portion thereof, the opening at the lower end of said conduit being normal to the forward direction when said container is in said substantially vertical position.

4. The combination of claim 3 in which said bracket assembly comprises a base member for attachment to the transom of a boat, a frame pivotally connected to said base member and projecting downward therebehind, and brace members attached to said frame and projecting forwardly therefrom to bear against the rear of the boat and maintain the rigidity of said bracket assembly relative thereto.

5. The combination of claim 3 in which said rigid bracket assembly comprises a bracket member for attachment to the transom of a boat, and two leg members connected to said bracket member and vertically adjustable relative thereto, said bracket assembly being rigid and non-articulated relative to the boat in any of said adjusted positions.

6. A bait well assembly comprising a bracket member for attachment to the transom of a boat, a frame connected to said bracket and extending downwardly therebehind, a substantially flat planing member pivotally mounted on said frame at a single axis near the lower end thereof, a bait can carried by said planing member and rotatable therewith about said single axis from a substantially horizontal position to a substantially vertical position behind said frame, and a water conduit extending from its inlet end below said planing member to its outlet end within said bait can, the inlet end of said water conduit being normal to the forward direction when said bait can is in said vertical position.

7. The combination of claim 6 and brace members attached to said frame and projecting forwardly therefrom to space said frame from the rear of a boat.

8. The combination of claim 6 and a buoyant member carried by said bait can at the upper forward portion thereof to prevent total submergence when said bait can is in said substantially horizontal position.

References Cited in the file of this patent

UNITED STATES PATENTS

| | | |
|---|---|---|
| 1,476,230 | Thompson | Dec. 4, 1923 |
| 2,272,569 | Luhmann | Feb. 10, 1942 |
| 2,330,870 | Collier | Oct. 5, 1943 |
| 2,485,684 | Aldredge | Oct. 24, 1949 |
| 2,689,427 | Piker | Sept. 21, 1954 |
| 2,834,138 | Pederson | May 13, 1958 |
| 2,923,087 | Cummings | Feb. 2, 1960 |